(12) United States Patent
Baker et al.

(10) Patent No.: US 8,118,091 B2
(45) Date of Patent: Feb. 21, 2012

(54) END PROTECTOR SYSTEM FOR TUBULAR GOODS

(76) Inventors: Jerry G. Baker, Houma, LA (US); Joseph C. Fox, Houma, LA (US)

( * ) Notice: Subject to any disclaimer, the term of this patent is extended or adjusted under 35 U.S.C. 154(b) by 0 days.

(21) Appl. No.: 12/658,199

(22) Filed: Feb. 4, 2010

(65) Prior Publication Data

US 2010/0212765 A1 Aug. 26, 2010

Related U.S. Application Data

(63) Continuation of application No. 11/639,599, filed on Dec. 15, 2006, now abandoned.

(51) Int. Cl.
*E21B 19/00* (2006.01)
*B65D 59/00* (2006.01)
*F16L 57/00* (2006.01)

(52) U.S. Cl. ................ 166/92.1; 138/96 R; 138/89

(58) Field of Classification Search ............ 166/92.1, 166/79.1, 93.1, 94.1, 97.1, 75.13; 138/96 R, 138/89.1–89.4; 285/901
See application file for complete search history.

(56) References Cited

U.S. PATENT DOCUMENTS

| | | | | |
|---|---|---|---|---|
| 1,887,332 A * | 11/1932 | Shrum | | 138/96 R |
| 1,934,681 A * | 11/1933 | Damsel | | 138/96 R |
| 3,104,681 A * | 9/1963 | Gray, Jr. | | 138/96 R |
| 3,187,777 A * | 6/1965 | Ashlock | | 138/96 R |
| 3,504,742 A * | 4/1970 | Crawford | | 166/75.13 |
| 3,606,074 A * | 9/1971 | Hayes | | 220/212 |
| 3,780,773 A * | 12/1973 | Haugen | | 138/89 |
| 3,807,457 A * | 4/1974 | Logsdon | | 138/89 |
| 3,856,050 A * | 12/1974 | Rooney | | 138/96 R |
| 4,014,368 A * | 3/1977 | Nelsen | | 138/109 |
| 4,139,023 A * | 2/1979 | Turley | | 138/96 T |
| 4,202,376 A * | 5/1980 | Forsell | | 138/89 |
| 4,203,474 A * | 5/1980 | Lequeux et al. | | 138/96 R |
| 4,423,753 A * | 1/1984 | Smith et al. | | 138/89 |
| 4,457,448 A * | 7/1984 | Beagell | | 220/327 |
| 4,799,716 A * | 1/1989 | Kujawa et al. | | 285/334.2 |
| 4,842,060 A * | 6/1989 | Paulus | | 166/85.1 |
| 4,848,458 A * | 7/1989 | Holdsworth et al. | | 166/92.1 |
| 4,856,674 A * | 8/1989 | Berney | | 220/258.3 |
| 4,905,764 A * | 3/1990 | Laput | | 166/379 |
| 5,074,336 A * | 12/1991 | Black | | 138/89 |
| 5,141,052 A * | 8/1992 | Bump | | 166/80.1 |
| 5,224,515 A * | 7/1993 | Foster et al. | | 138/89 |
| 5,337,792 A * | 8/1994 | Tempel | | 138/96 R |
| 5,368,178 A * | 11/1994 | Towns et al. | | 215/317 |
| 5,421,556 A * | 6/1995 | Dodge et al. | | 256/1 |
| 5,538,154 A * | 7/1996 | Von Holdt | | 220/277 |
| 5,622,208 A * | 4/1997 | Vinson | | 138/89 |
| 5,678,720 A * | 10/1997 | Van Melle | | 220/287 |
| 5,866,218 A * | 2/1999 | Meuth | | 428/36.5 |
| 5,921,282 A * | 7/1999 | Castillo et al. | | 138/89 |

(Continued)

*Primary Examiner* — Thomas Beach
*Assistant Examiner* — Matthew Buck
(74) *Attorney, Agent, or Firm* — Ted M. Anthony

(57) ABSTRACT

An end protector system for tubular goods including, but not necessarily limited to, drilling riser pipe. The end protector system utilizes lightweight substantially rigid, UV-stabilized molded plastic members that can quickly and easily cover box and pin end connections of drilling riser pipe, as well as ancillary conduit holes, bolt holes and/or other openings. The end protector system of the present invention can be used on tubular goods having an end connection flange, as well as those without an end connection flange, to block access to internal surfaces of the drilling riser components. The end protector system of the present invention further includes a retention system to ensure that individual end protectors remain in place during transportation and/or prolonged storage of such tubular goods.

1 Claim, 4 Drawing Sheets

U.S. PATENT DOCUMENTS

| | | |
|---|---|---|
| 6,076,559 A * | 6/2000 | Castillo et al. .................. 138/89 |
| 6,105,669 A * | 8/2000 | Davis ......................... 166/75.13 |
| 6,131,654 A * | 10/2000 | Holscher ...................... 166/79.1 |
| 6,332,478 B1 * | 12/2001 | Holden et al. ............... 138/96 R |
| 6,532,992 B1 * | 3/2003 | Holden ....................... 138/96 R |
| 6,955,013 B2 * | 10/2005 | Thompson ................... 52/223.1 |
| 6,978,803 B2 * | 12/2005 | Brown et al. ................ 138/96 R |
| 7,231,968 B2 * | 6/2007 | Owens ........................ 166/75.13 |
| 7,347,455 B1 * | 3/2008 | Taquino ..................... 285/124.1 |
| 2002/0185279 A1 * | 12/2002 | Blair et al. ..................... 166/335 |
| 2004/0144793 A1 * | 7/2004 | Lessard et al. ................. 220/836 |
| 2008/0072989 A1 * | 3/2008 | Lepe et al. .................. 138/96 R |

* cited by examiner

END PROTECTOR SYSTEM FOR TUBULAR GOODS

CROSS REFERENCES TO RELATED APPLICATIONS:

THIS APPLICATION IS A CONTINUATION OF U.S. NON-PROVISIONAL patent application Ser. No. 11/639,599 FILED Dec. 15, 2006 now abandoned.

STATEMENTS AS TO RIGHTS TO INVENTIONS MADE UNDER FEDERALLY SPONSORED RESEARCH AND DEVELOPMENT:

NONE

BACKGROUND OF THE INVENTION

1. Field of the Invention

The present invention pertains to a system of molded cap devices to protect the end connections of tubular goods. More particularly, the present invention pertains to a system of molded cap devices to protect end connections of drilling riser pipe sections, and to prevent access to internal portions thereof.

2. Brief Description of the Prior Art

In offshore environments, wells are often drilled from fixed platforms to explore for and develop oil and gas reserves. However, such fixed platforms may not exist in certain areas where drilling prospects are located. As a result, offshore wells are frequently drilled using moveable rigs such as drill ships, semi-submersible rigs and jack-up rigs that are not supported by fixed platforms.

Drilling operations conducted from moveable drilling rigs differ from operations conducted from platform-supported drilling rigs in many respects. Among these differences is the location of the blowout preventor assembly and wellhead assembly. Frequently, such equipment is not located on the rig itself, but rather on the sea floor. In such cases, specialized equipment known as a drilling riser is used.

Generally, drilling risers consist of several sections of pipe, as well as special fittings, that are joined together to form a continuous length of pipe. A riser serves as a conduit to connect a drilling rig (which is located at or near the surface of the water) to a wellhead assembly (which is located at or near the sea floor). When installed, a drilling riser serves as a guide for drilling equipment, as well as a conductor for drilling fluid. In many cases, drilling risers can include special devices to compensate for any movement of the drilling rig caused by waves.

Although the dimensions can vary, individual sections of drilling riser can often be greater than three (3') feet in diameter and seventy-five (75') feet in length. Each riser section is typically configured with a male (pin) connection at one end, and a female (box) connection at the opposite end. Although such connections are used to interlock one section of riser to an adjoining section, flanges are also frequently added at both ends of each riser section; such flanges can be bolted together to further secure adjoining sections of riser pipe to each other.

Wellheads, blow out preventors and other types of subsea equipment are typically controlled from the surface (i.e., the drilling rig) using control lines that extend along substantially the entire length of a drilling riser. For this reason, drilling risers frequently include ancillary tubes for housing such control lines; such tubes generally terminate in openings at both ends of individual riser pipe sections. Further, different wellhead manufacturers utilize drilling risers having different configurations. As such, the end connections of such drilling riser sections will often vary for different wellhead manufacturers.

After riser pipe is manufactured at a land-based manufacturing facility, the pipe must typically be stored at a pipe yard, loading dock or other location prior to being shipped to a drilling rig or offshore location. Further, such riser pipe must also be stored between drilling projects. During such storage, it is generally beneficial to close the ends of each section of riser pipe in order to prevent foreign objects or animals from entering such pipe. Moreover, it is also beneficial to protect the end connections and flanges of such riser pipe while such pipe is being loaded, unloaded and/or transported.

End protectors for threaded tubular goods are known in the art. Similarly, end protectors for sections of riser pipe are also known in the art. However, such prior art means for protecting riser pipe generally comprise metal plates that are flat bolted on the flanges of such riser pipe sections, or are curved open-faced sections that are bolted on the flanges to absorb any impact to the main and ancillary piping. Said metal plates frequently fail to cover all openings on the riser including, but not limited to, ancillary line openings and flange bolt holes. Further, such metal plates are bulky and heavy; such plates can often weigh hundreds of pounds. As such, said plates are frequently difficult to handle, install and remove, and can cause injuries to personnel handling or working with such plates.

Flexible molded polyurethane and rubber covers have also been developed to cover the ends of individual riser pipe sections. Such molded caps are preferable to metal plates, in that said caps can be specifically molded to fit both male and female configurations. Further, said molded caps can be easily customized to fully cover all individual openings associated with a particular type of riser pipe, including ancillary line(s) and flange/bolt holes. However, polyurethane is negatively affected by weathering including, without limitation, ultraviolet ("UV") waves. Thus, such molded polyurethane covers are susceptible to losing their shape. When this occurs, such molded covers can fall off the riser pipe sections, thereby leaving such pipe sections exposed.

Thus, there is a need for a versatile end protector system for tubular goods including, but not necessarily limited to, riser pipe. Such end protector system must avoid the problems associated with existing metal plates and molded polyurethane caps.

SUMMARY OF THE PRESENT INVENTION

The present invention comprises an end protector system for tubular goods including, but not necessarily limited to, drilling riser pipe. Such end protector system utilizes substantially rigid, UV-stabilized molded plastic members that can cover box and pin end connections of drilling riser pipe, as well as ancillary conduit holes, bolt holes and/or other openings. The end protector system of the present invention can be used on tubular goods having an end flange, as well as those without an end connection flange. The end protector system of the present invention further includes a retention system to ensure that individual end protectors remain in place during transportation and/or prolonged storage of such tubular goods.

The end protector system of the present invention protects the end connections of drilling riser sections, and prevents access to internal surfaces of the central bore and other ancillary conduit holes of such drilling riser pipe. In the preferred embodiment of the present invention, said end protector system permits access to lifting eyes on said riser pipe; as such, said end cap protector system can remain installed on such riser pipe while it is being lifted by a crane or other hoisting device. In an alternative embodiment of the present invention, said end protector system has a "unisex" configuration, in that it can be utilized to fit on both box and pin connections of riser pipe.

The end protector system of the present invention utilizes lightweight end protectors that can be easily handled by personnel. Said end protectors shield end connections of tubular goods from damage during transportation and/or storage of such tubular goods. Further, such end protectors can remain in the elements, including direct sunlight, for extended periods of time without becoming damaged or destroyed.

DETAILED DESCRIPTION OF A PREFERRED EMBODIMENT OF THE INVENTION

Figure 1:
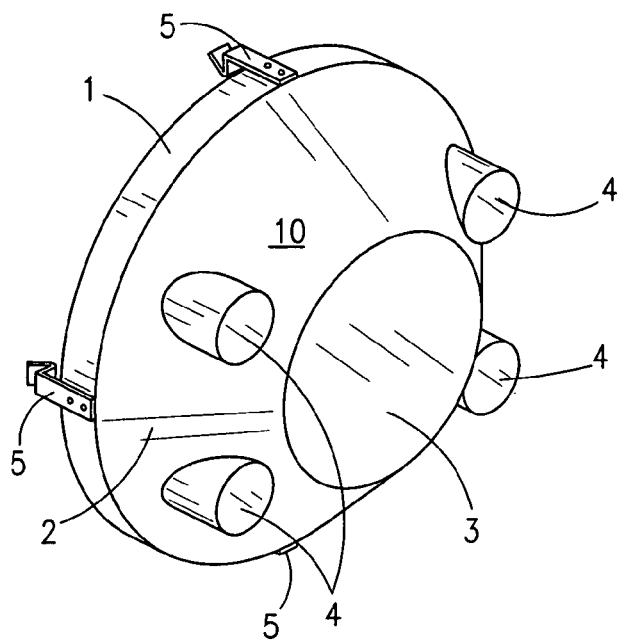
FIG. 1 depicts a side perspective view of an end protector of the present invention compatible with a pin end of a section of drilling riser pipe.

Referring to the drawings, FIG. 1 depicts a side perspective view of end protector 10 of the present invention. End protector 10 depicted in FIG. 1 is compatible with a pin end of a section of drilling riser pipe having a flange. In the preferred embodiment, end protector 10 (as well as all end protectors depicted in the drawings) is a substantially rigid molded plastic component. Said plastic includes UV-stabilization additives well known to those having skill in the art of plastic molding.

End protector 10 generally comprises body section 1, tapered surface 2 and end surface 3. It is to be observed that the specific dimensions of body section 1, tapered surface 2 and end surface 3 are beneficially designed to fit the appropriate corresponding dimensions of a tubular good connection (such as, for example, the pin end connection of a section of drilling riser pipe) upon which said end protector 10 is to be installed. By way of illustration, but not limitation, body section 1 should have the appropriate diameter to fit around a flange connection of a section of riser pipe, while tapered surface 2 must extend sufficiently far to cover any pin connection extending from such section of riser pipe.

Still referring to FIG. 1, end protector 10 includes a plurality of projections 4. In the preferred embodiment, said projections 4 extend from tapered surface 2 of end protector 10 and can cover the ends (and openings thereof) of control lines or other ancillary lines of a section of drilling riser pipe. Further, in the preferred embodiment, a plurality of clip fasteners 5 are disposed along the outer surface of body section 1 of end protector 10.

Figure 2:
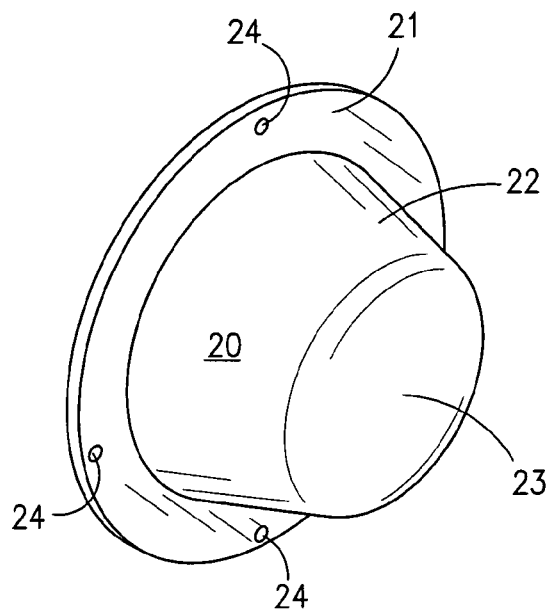
FIG. 2 depicts a front perspective view of an end protector of the present invention compatible with a box end of a section of drilling riser pipe.
Figure 2A:
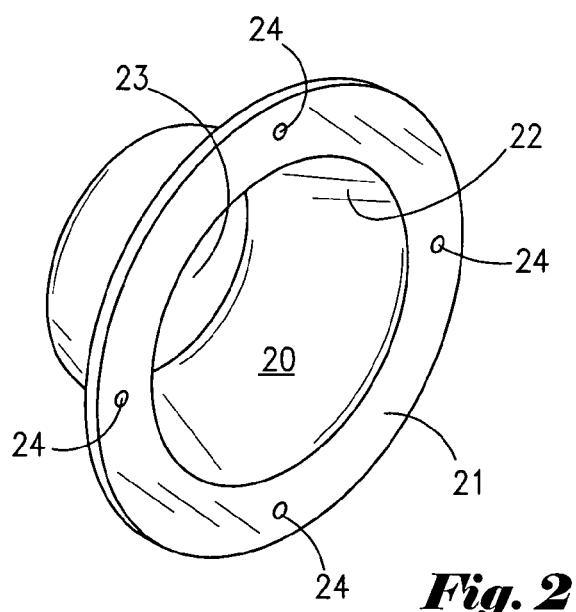
FIG. 2a depicts a back perspective view of an end protector of the present invention compatible with a box end of a section of drilling riser pipe.

FIG. 2 depicts a front perspective view of an end protector 20 of the present invention. End protector 20 is similar to end protector 10, except that end protector 20 is compatible with a box end of a section of drilling riser pipe. End protector 20 includes rim section 21, tapered section 22 and end section 23. In the preferred embodiment, the dimensions of tapered section 22 are designed so that end protector 20 is held in place by a pre-loaded compression fit of approximately 1/16 of an inch. A plurality of apertures 24 are disposed on rim section 21. By way of illustration, but not limitation, UV-protected tie wraps can be threaded through apertures 24, around ancillary lines of a section of drilling riser pipe, and tightened. In this manner, end protector 20 can be easily, quickly and securely attached to an end of a section of drilling riser pipe. FIG. 2a depicts end protector 20, but from a reverse angle relative to the view depicted in FIG. 2.

It is to be observed that the dimensions and basic configurations of end protectors 10 and 20 can be varied as necessary to meet particular applications. Thus, the specific dimensions and configurations of said end protectors can be set during the molding process, and can be tailored to fit dimensions and configurations of particular tubular goods with which said end protectors are to be utilized.

Figure 3:
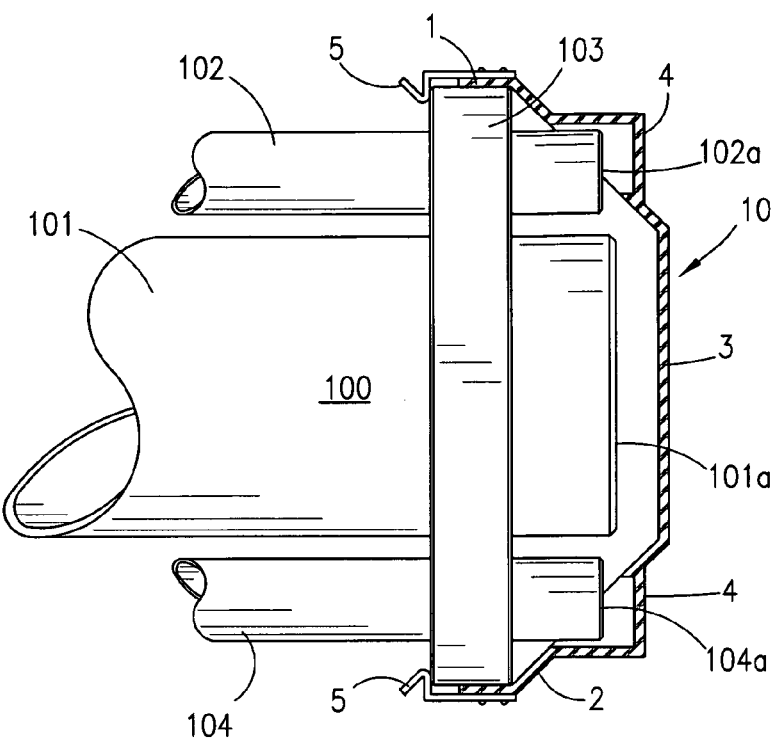
FIG. 3 depicts a side sectional view of an end protector of the present invention installed on a pin end of a section of drilling riser pipe having a flange.

FIG. 3 depicts a side sectional view of end protector 10 of the present invention installed on a pin end of a section of drilling riser pipe 100 having flange connection 103 near its pin end. Specifically, drilling riser pipe 100 comprises central tubular member 101, as well as ancillary tubular control lines 102 and 104. Said tubular members include ends 101a, 102a and 104a; although not visible from this perspective in FIG. 3, each of said ends 101a, 102a and 104a have openings that lead into central longitudinal bores of said tubular members.

End protector 10 is installed on drilling riser section 100. As such, the specific dimensions of body section 1, tapered surface 2 and end surface 3 of end protector 10 are beneficially designed to fit the appropriate corresponding dimensions of drilling riser pipe section 100. Body section 1 has the appropriate diameter to accommodate and fit around flange connection 103. Similarly, tapered surface 2 must extend sufficiently far to cover end 101a (pin end connection) of central tubular member 101, while projections 4 must be spaced and sized to cover ends 102a and 104a of ancillary lines 102 and 104.

In this embodiment, clip fasteners 5 are disposed along the outer surface of body section 1 of end protector 10. Such clip fasteners fit around and behind flange 103 and secure end protector 10 on drilling riser 100. In this configuration, end protector 10 closes off or blocks access to internal surfaces of drilling riser 100 accessible through openings 101a, 102a and 104a.

Figure 4:
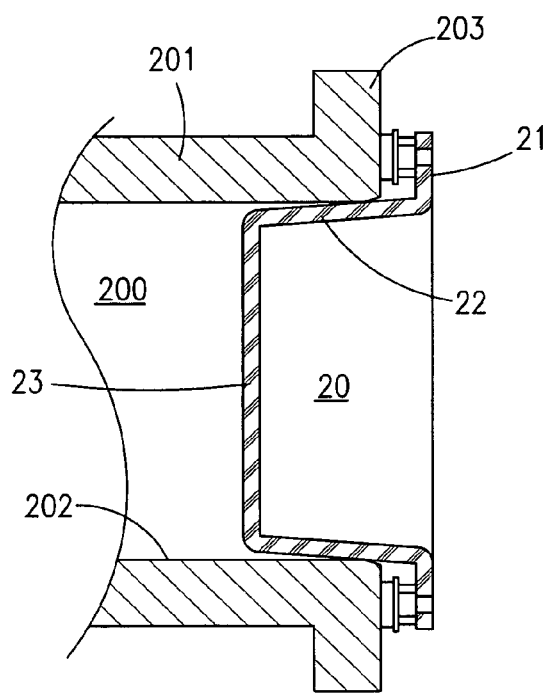
FIG. 4 depicts a side sectional view of an end protector of the present invention installed on a box end of a section of drilling riser pipe having a flange.

FIG. 4 depicts a side sectional view of end protector 20 of the present invention installed on a box end of a section of drilling riser pipe 200 having a flange 203. Riser pipe 200 includes tubular member 201 defining internal surface 202. End protector 20 includes rim section 21, tapered section 22 and end section 23. When installed, end protector 20 closes off or blocks access to internal surface 202 of drilling riser 200 via the box end connection of drilling riser 200.

Figure 5:
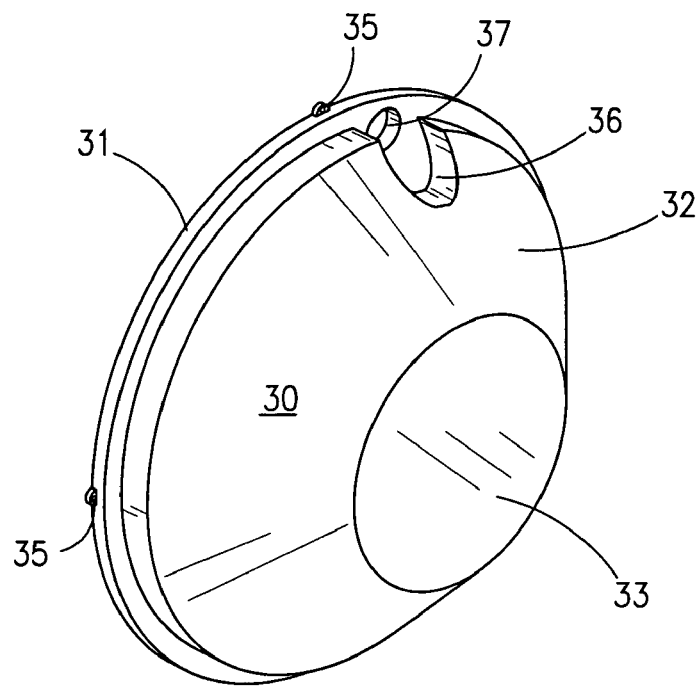
FIG. 5 depicts a side perspective view of an alternate embodiment of an end protector of the present invention having a cut away section.

In the preferred embodiment, the dimensions of tapered section 22 are designed so that end protector 20 is held in place by a pre-loaded compression fit of approximately 1/16 of an inch. Although not visible in FIG. 4, a plurality of apertures 24 are disposed on rim section 21. By way of illustration, but not limitation, UV-protected tie wraps can be threaded through apertures 24, around ancillary lines of a section of drilling riser pipe, and tightened. In this manner, end protector 20 can be easily, quickly and securely attached to an end of a section of drilling riser pipe FIG. 5 depicts a side perspective view of an alternate embodiment of end protector 30 of the present invention. Like end protector 10 depicted in FIG. 1, end protector 30 generally comprises a body section 31, tapered surface 32 and end surface 33. Also, like end protector 10, the specific dimensions of body section 31, tapered surface 32 and end surface 33 are beneficially designed to fit the appropriate corresponding dimensions of a tubular good connection (such as, for example, the pin end connection of a section of drilling riser pipe) upon which said end protector 30 is to be installed. Unlike end protector 10, end protector 30 does not include a plurality of projections, such as projections 4 on end protector 10, thus allowing end protector 10 to be utilized as a "unisex" end protector (that is, a protector that can be used on both pin or box end connections.)

End protector 30 includes a plurality of eyelets 35 disposed along the outer periphery of body section 31. End protector 30 can be affixed to a section of drilling riser pipe by threading an attachment means through said eyelets and attaching same to said drilling riser pipe. By way of illustration, but not limitation, UV-protected tie wraps can be threaded through eyelets 35, around the ancillary lines of a section of drilling riser pipe, and tightened. In this manner, end cap 30 can be easily, quickly and snuggly attached to an end of a section of drilling riser pipe. An expandable hole plug (not shown) such as, for example, a plug disclosed in U.S. Pat. No. 6,453,603, can be used as a closure for aperture 37 to complete the encapsulation of end protector 30 and assist in securing end protector 30 to said drilling riser pipe.

End protector 30 also includes at least one cut away section 36 that extends primarily into tapered surface 32. End protector 30 also includes aperture 37 that is situated within cut away section 36. Said aperture is beneficially positioned to align with a lifting eye on a section of drilling riser pipe. As such, a shackle or slings attached to a crane or other hoisting mechanism can pass through aperture 37 and be attached to the lifting eye of such section of drilling riser so that said drilling riser can be moved or otherwise manipulated without having to remove end protector 30 from said drilling riser pipe.

Figure 6:
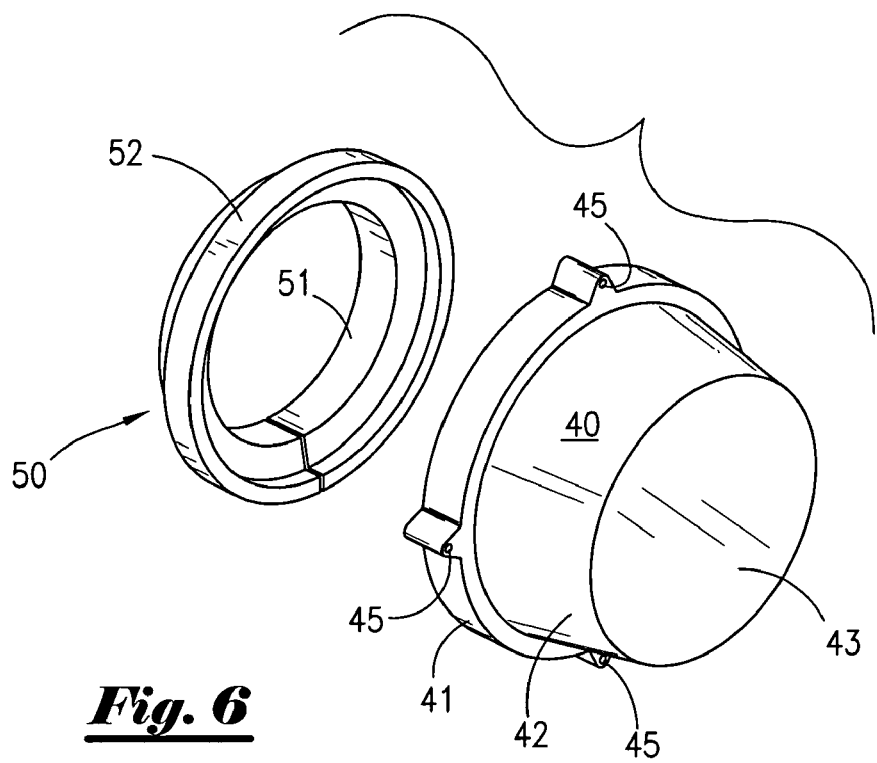
FIG. 6 depicts an exploded perspective view of an alternative embodiment of an end protector of the present invention.

FIG. 6 depicts an exploded perspective view of an alternative embodiment of an end protector 40 of the present invention. End protector 40 generally comprises a body section 41, tapered surface 42 and end surface 43. The specific dimensions of body section 41, tapered surface 42 and end surface 43 are beneficially designed to fit the appropriate corresponding dimensions of a tubular good connection (such as, for example, the pin end connection of a section of drilling riser pipe) upon which said end protector 40 is to be installed. End protector 40 also includes a plurality of eyelets 45 disposed along the outer periphery of body section 41.

As discussed in detail above, configurations of drilling risers can vary depending upon a number of different factors including, but not necessarily limited to, the type of drilling rig to be utilized, the configuration of subsea wellhead or other equipment to be used, and surface and subsurface conditions to be encountered. In some cases, adjoining sections of drilling riser pipe are not joined together using bolted flanges. As such, the end protectors of the present invention cannot be attached to the ends of said drilling riser sections using attachment means that are dependent upon the existence of such flanges (such as, for example, clip fasteners 5 of end protector 10 depicted in FIG. 3).

Referring to FIG. 6, split ring 50 can be utilized, particularly in connection with tubular goods that do not have a flange connection. Split ring 50 generally comprises substantially cylindrical body member 52 having rim extension 51. Rim extension 51 is generally sized to be slightly smaller that the opening defined by body section 41 of end protector 40.

Figure 7:
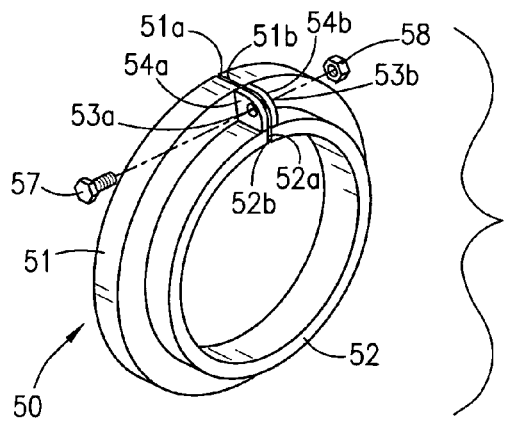
FIG. 7 depicts a side perspective view of a split ring member of an alternative embodiment of an end protector of the present invention.

FIG. 7 depicts a side perspective view of a split ring member 50 of the present invention, shown from the reverse angle relative to the view depicted in FIG. 6. Split ring 50 has substantially cylindrical body member 52 having rim extension 51; however, because split ring 50 is split, cylindrical body member has ends 52a and 52b, while rim extension 51 has ends 51a and 51b. Mating flange members 53a and 53b are disposed at ends 52a and 52b, respectively, of cylindrical body member 52. Aperture 54a extends through flange member 53a, while aperture 54b extends through flange 53b.

When installed around the outer circumference of a section of drilling riser pipe, any gap existing between ends 52a and 52b of body member 52 closes, and mating flange members 52a and 52b are joined together. In this configuration, apertures 54a and 54b are aligned with each other. A fastening means such as, for example, bolt 57 can be threaded through said aligned apertures 54a and 54b, and easily and quickly secured in place using wing nut 58. In this manner, split ring 50 can be secured to the body of a section of a drilling riser, including a section of drilling riser lacking a flange connection.

Referring back to FIG. 6, split ring 50 can be installed on a section of drilling riser (not depicted in FIG. 6). Thereafter, end protector 40 can be installed on split ring 50 and secured in place. Said end protector 40 can be secured in place by threading an attachment means through eyelets 45 and attaching same to said drilling riser pipe. By way of illustration, but not limitation, UV-protected tie wraps can be threaded through eyelets 45, around the ancillary lines of a section of drilling riser pipe, and tightened. In this manner, end cap 40 can be easily, quickly and snuggly attached to an end of a section of drilling riser pipe lacking a flange connection.

Figure 8A:
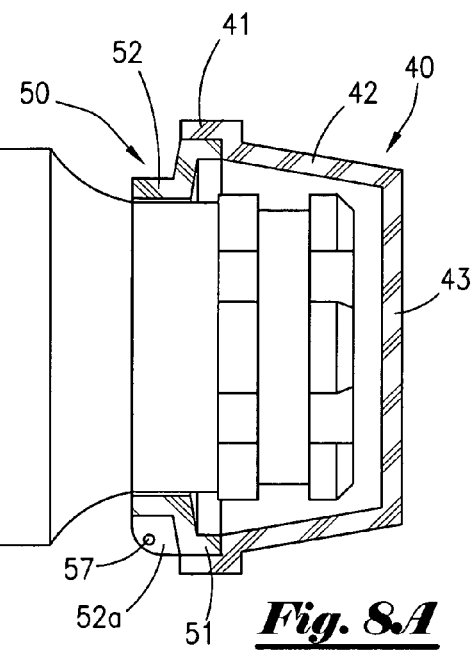
FIG. 8a depicts a side sectional view of an end protector of the present invention installed on a box end of a section of drilling riser pipe without a flange connection.
Figure 8B:
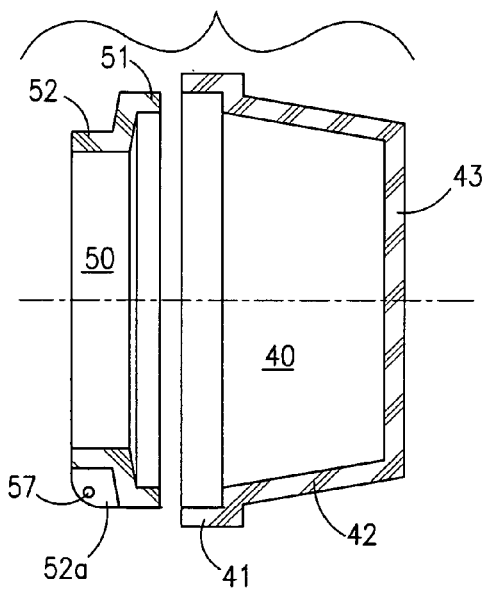
FIG. 8b depicts an exploded side sectional view of an end protector of the present invention depicted in FIG. 8a (not including the drilling riser pipe).

FIG. 8a depicts a side sectional view of end protector 40 of the present invention installed on a box end of a section of drilling riser pipe 300. Drilling riser pipe 300 does not include a flange connection. Split ring 50 is installed around the outer circumference of drilling riser pipe section 300, so that mating flange members 52a and 52b (not visible in FIG. 8a) are joined together. Bolt 57 is threaded through aligned apertures 54a and 54b of flange members 52a and 52b, and easily and quickly secured in place. Once split ring 50 is installed, end protector 40 can be installed on split ring 50 and secured in place. FIG. 8b depicts an exploded side sectional view of end protector 40 and split ring 50 of the present invention depicted in FIG. 8a (not including the drilling riser pipe) to illustrate how end protector 40 mates with split ring 50.

Figure 9:
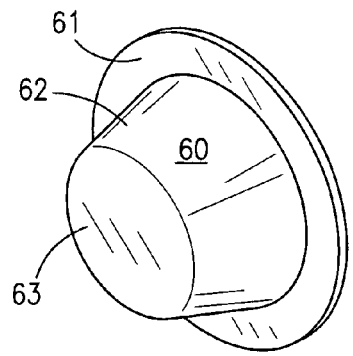
FIG. 9 depicts a perspective view of a hole-plug of the present invention.

FIG. 9 depicts a perspective view of hole-plug 60 of the present invention. Hole-plug 60 is similar to end protector 20 depicted in FIGS. 2 and 2a. Hole-plug 60 includes rim section 61, tapered section 62 and end section 63. In the preferred embodiment, the dimensions of tapered section 62 are designed so that hole-plug 60 is held in place within an opening (such as, for example, a bolt hole of a connection flange of a section of drilling riser pipe) by a pre-loaded compression fit. It is to be observed that hole-plug 60 can be inserted in any openings that may be beneficially plugged and further, may be used in addition to any other end protectors disclosed herein.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed: pg,17

1. An apparatus for covering an end of a section of drilling riser pipe having an end connection flange, said flange having a rear surface oriented toward said pipe and a front surface oriented away from said pipe, comprising:
   a. an ultraviolet stabilized plastic cap, wherein said ultraviolet stabilized plastic cap further comprises:
      i. a body member having an opening fitting around said end connection flange;
      ii. a substantially flat surface, wherein said substantially flat surface is smaller than said body member and is oriented parallel to said flange; and
      iii. a tapered surface, wherein said tapered surface extends from said body member to said substantially flat surface; and
   b. a split ring member disposed circumferentially around said pipe; and
   c. at least one tie-wrap attaching said cap to said split ring member.

* * * * *